United States Patent Office 3,697,449
Patented Oct. 10, 1972

3,697,449
ALKALI MODERATION OF SUPPORTED RUTHENIUM CATALYSTS
Loren D. Brake, Wilmington, Del., assignor to E. I. du Pont de Nemours and Company, Wilmington, Del.
No Drawing. Continuation-in-part of application Ser. No. 691,991, Oct. 20, 1969, which is a continuation-in-part of abandoned application Ser. No. 516,084, Dec. 23, 1965. This application Dec. 14, 1970, Ser. No. 98,048
Int. Cl. B01j *11/08, 11/22*
U.S. Cl. 252—474           9 Claims

ABSTRACT OF THE DISCLOSURE

Supported ruthenium catalysts are moderated with an alkali metal hydroxide or alkoxide by mixing the supported catalyst and the alkali metal compound in the reaction medium of a hydrogenation process which may contain up to about 5% of water, at a temperature ranging from about 30° C. to about 300° C. The moderated catalyst is an effective hydrogenation catalyst for the hydrogenation of aromatic amines to the corresponding saturated cyclic amines.

CROSS-REFERENCE TO RELATED APPLICATIONS

This application is a continuation-in-part of my copending application Ser. No. 691,991, filed Oct. 20, 1969, now abandoned which was a continuation-in-part of my application Ser. No. 516,084, filed Dec. 23, 1965 and now abandoned.

BACKGROUND OF THE INVENTION

This invention relates to the preparation of moderated catalysts. More particularly it is directed to the in situ moderation of supported ruthenium catalysts comprising admixing the supported catalyst with a basic alkali metal compound in the reaction medium of a hydrogenation process.

Alkali modification of ruthenium catalysts has been accomplished in the past by a variety of methods such as disclosed for example in U.S. Pat. No. 2,930,765 and U.S. Pat. No. 2,930,766. However, such methods necessitate several process steps and require a "mildly alkaline" supporting material. When the candidate supporting material itself is not mildly alkaline, it must be subjected to a special pretreatment process.

U.S. 3,193,584 teaches the use of aqueous alkaline solutions as the reaction media for the hydrogenation of hydroxy and alkoxy-substituted aromatics in the presence of ruthenium catalysts. Although this process is said to give improved reaction rates, it is mainly applicable to compounds which are soluble in water or in alcohol-water systems. However, such aqueous alkaline systems are not useful for the hydrogenation of aromatic amines since the presence of more than about 5% of water in the medium results in the formation of undesirable by-products.

There is a need, therefore, for a simple procedure for making alkali-moderated supported ruthenium catalysts for use in the hydrogenation of aromatic amines.

SUMMARY OF THE INVENTION

This invention is directed to a process for an in situ preparation of an alkali moderated supported ruthenium catalyst, useful in the hydrogenation of aromatic amines to saturated cyclic amines, comprising admixing the supported catalyst with an alkali metal hydroxide or methoxide in the hydrogenation reaction medium.

DESCRIPTION OF THE INVENTION

Suitable supported catalysts for moderation by the process of this invention are those which will retain alkali metal cations when treated by the process of this invention, and in which ruthenium is the active component and the support material is an inert carrier.

Inert carriers are numerous and well known to those skilled in the art. In general, a carrier is any material which will support a catalyst. Suitable carriers are described in Chapter 7 of Catalysis by S. Berkman, J. C. Morrell and G. Egloff, Reinhold Publishing Corp., New York (1940) or Chapter 6 of Catalysis vol. 1 by P. H. Emmett, Reinhold Publishing Corp., New York (1940). Representative of inert carriers are alumina, barium sulfate, kieselguhr, carbon, pumice, diaspore, bauxite, periclase, zirconia, titania, diatomaceous earth, calcium sulfate, calcium carbonate, barium oxide, barium carbonate, calcium oxide, strontium oxide, strontium sulfate, strontium carbonate, silica, silica-alumina, etched nickel, Nichrome, Inconel wire, rare earth carbonates, rare earth oxides and mixed rare earth oxide-carbonates. Preferred carrier materials for the catalysts of this invention are alumina, barium sulfate, kieselguhr, carbon, calcium carbonate, rare earth oxides, rare earth carbonates and mixed rare earth oxide-carbonates. The most preferred carrier materials are alumina, barium sulfate and kieselguhr.

Suitable supported catalysts can be prepared by a number of methods, for example, by slurrying the support in an aqueous ruthenium chloride solution, precipitating the ruthenium values with ammonium bicarbonate, digesting at 60–90° C., filtering, washing, drying, reducing, and activating by means well known in the art. Other means for preparing the supported catalysts will be obvious to those skilled in the art. The reduction of the catalyst can be carried out in the amine hydrogenation step itself.

As stated above, supported ruthenium catalysts are alkali moderated according to this invention by merely admixing the supported catalyst and the basic alkali metal compound, ordinarily in an amount ranging from about 1% to about 35% based on the weight of the supported catalyst, in the reaction medium of a process for the hydrogenation of aromatic amines to the corresponding saturated cyclic amine compounds in the presence or absence of a solvent.

In the case of aromatic amines with melting points greater than 100° C., the use of a solvent is often desirable to simplify processing. The most desirable solvent is the hydrogenation product itself. When a solvent other than the hydrogenation product is used, liquids not subject to hydrogenation under the process conditions should be employed. Representative of the suitable solvents are saturated aliphatic and alicyclic hydrocarbons, such as cyclohexane, hexane and cyclooctane; low molecular weight alcohols such as methyl alcohol, ethyl alcohol, isopropyl alcohol, and n-butanol; and preferably aliphatic and alicyclic ethers such as n-propyl ether, n-butyl ether, ethyl ether, isopropyl, ether, isobutyl ether, the amyl ethers, tetrahydrofuran, dioxane and dicyclohexyl ether. Mixtures of two or more solvents can also be used. Water can also be present in amounts not exceeding about 5 weight percent of the reaction medium, but preferably no more than about 2%. In the substantial absence of water the yield and the purity of the cyclic amine product is considerably increased.

The amount of solvent can be as low as about 20 weight percent of the starting aromatic amine. However, amounts of solvent of about 25% to 150% of the weight of the starting aromatic amine will normally be used. Greater amounts of solvent can of course be used, even as high as 1000% to 2000% based on the starting amine, but such amounts merely dilute the components in the reaction medium and offer no special advantages.

Virtually, any aromatic amine can be hydrogenated in the presence of moderated supported ruthenium catalysts, and the in situ moderation of the catalyst can be carried out in the hydrogenation medium containing any suitable aromatic amine. The starting amine should not have substituents which could be split off, such as halogen atoms, and preferably should not have groups which themselves would undergo hydrogenation, such as nitro or nitroso groups. Substituents such as hydroxyl, alkyl, aryl, alkoxy or aryloxy groups can be present. The amine can have one or more aromatic rings, and it can have more than one amino group. Representative aromatic amines which can be used in the process of this invention include the following:

Aniline
2-ethylaniline
N,N-dimethylaniline
N-ethyl-N-methylaniline
2,4-diamino-N-phenylaniline
o, m, and p-phenylenediamine
2,4-diaminotoluene
1,2,4,5-tetraaminobenzene
4-methoxy-m-phenylenediamine
4-amino-m-cresol
4-amino-2,5-xylenol
4-amino-N-phenylaniline
2-amino-N-methylaniline
2-methoxy-5-methylaniline
o, m, and p-aminobenzonitrile
N-methylaniline
o, m, and p-toluidine
N-isobutyl-p-phenylenediamine
o, m, and p-xylylenediamine
o, m, and p-anisidine
N-isoamyl-p-phenylenediamine
N-benzyl-p-phenylenediamine
N-cyclohexyl-p-phenylenediamine
N,N'-di(n-propyl)-p-phenylenediamine
N-(n-butyl)-N'-benzyl-p-phenylenediamine
N,N'-dibenzyl-p-phenylenediamine
N-ethyl-m-phenylenediamine
N-ethyl-o-phenylenediamine
N-methyl-m-phenylenediamine
N,N-diethyl-p-phenylenediamine
N-methyl-N-(n-propyl)-p-phenylenediamine
N-(p-aminophenyl)piperidine
Benzylamine
N-isopropylaniline
N-ethyl-o-toluidine
N-ethyl-N-benzyl-m-toluidine
p-(N,N-dimethylamino)benzylamine
N-phenylbenzylamine
N,N-dimethylbenzylamine
N-ethyl-N-phenylbenzylamine
N-phenyl-p-phenylenediamine
1-amino-naphthalene
1-(aminomethyl)-2-hydroxynaphthalene
N-ethyl-1-aminonaphthalene
N-decyl-1-aminonaphthalene
N-phenyl-1-aminonaphthalene
1,5-diaminonaphthalene
Pyridine
3-aminopyridine
2-amino-4,6-dimethylpyridine
2,4-dimethylpyridine
2,6-diaminopyridine
2-amino-5-methylpyridine
2-(2-aminoethyl)pyridine
2-aminopyridine
4,4'-methylenedianiline
Benzidine
Tolidine
4,4'-methylenedi(1-naphthylamine)
4,4'-oxydianiline
4,4'-ethylenedianiline
4,4'-methylenebis(3-methoxyaniline)
4,4'-methylenedibenzylamine
4,4'-methylenebis(N-ethyl-o-toluidine)
2,4-bis(4-aminobenzyl)aniline
4,4'-methylenebis(N,N-dimethylaniline)
4,4'-methylenebis(N-methylaniline)
N,N,N',N'-tetramethylbenzidine
bis(3,4-diaminophenyl)methane
bis(3-methyl-4-aminophenyl)methane
2,7-diaminofluorene
2-aminofluorene
3-aminoquinoline
8-aminoquinoline
5-aminoindole
3-[(dimethylamine)methyl]indole
1-aminoanthracene
2-aminoanthracene The catalyst moderation can be carried out by mixing the catalyst, aromatic amine, basic alkali metal compound, and optionally a solvent in either the feed mix tank or the hydrogenation converter. The moderation temperature will be in the range of about 30° C. to 300° C. When the alkali moderation is performed in the feed mix tank of the hydrogenation process, the temperature range is from about 30° C. to 200° C., the preferred temperature range being about 40° C. to 150° C. When the alkali moderation is carried out in the hydrogenation converter, the temperature range is about 30° C. to 300° C., and the preferred temperature range is about 175° C. to 250° C., depending on the optimal temperature for the hydrogenation of aromatic amines to the corresponding saturated cyclic amines.

When the alkali moderation is carried out in the hydrogenation converter, it will be at a hydrogen partial pressure above about 200 p.s.i. and ordinarily between about 2000 and 5500 p.s.i. Higher hydrogen partial pressures can be used if desired but no practical advantage is obtained. The presence of hydrogen is, of course, not necessary for the alkali moderation of the ruthenium catalyst.

The extent of alkali moderation can be determined by analysis of the treated catalyst for alkali metal content using conventional analytical means such as atomic adsorption spectrophotometry. Thus, for example, if a supported catalyst is found to contain 5 weight percent sodium, it is considered to be alkali moderated to the extent of 5%. The extent of alkali moderation can range from 0.1% up to 15%, depending to some degree on the support and the catalyst shape. An alumina supported ruthenium catalyst, for example, will associate to a greater degree with a basic alkali metal compound than will a barium sulfate supported ruthenium catalyst; and finely divided catalysts, for example, can be moderated with larger amounts than pilled catalysts. It is preferred, however, that the extent of alkali moderation lie in the range of 0.5% to 10%.

Typical basic alkali metal compounds for use in the process of this invention are the hydroxides and alkoxides of the alkali metals sodium, potassium, lithium, rubidium and cesium. The preferred alkali metals are sodium, potassium and lithium, the most practical being sodium and potassium. The preferred alkoxides are the methoxides, ethoxides, propoxides, and butoxides.

The preferred embodiment of this invention comprises charging dry solid sodium or potassium alkoxide, or an aqueous or alcoholic solution or slurry of sodium or potassium hydroxide, into a hydrogenation process which is being carried out over a supported ruthenium catalyst which will retain alkali metal cations. The basic alkali metal compound is thereby admixed with the supported ruthenium catalyst in the presence of the aromatic amine, and the admixture is heated in accordance with the temperature at which the hydrogenation process is being run. While the amount of basic alkali metal compound used is not critical, the amount will ordinarily be from about 1% to about 35%, preferably 3% to 25% based on the weight of supported catalyst. No practical advantage is gained by increasing the amount of the catalyst beyond the upper limit, while amounts below the lower limit do not always provide sufficient moderation.

If the basic alkali metal compound is added to the hydrogenation process as an aqueous slurry or solution, the amount of water added should be no more than about 5% by weight of the reaction mixture. Excessive quantities of water will normally result in the formation of undesirable by-products including the corresponding hydroxy derivatives, deamination products, and polyamines.

Supported ruthenium catalysts capable of retaining alkali metal cations which have become deactivated through use can be rejuvenated by the process of this invention. Such a procedure is of considerable advantage over prior art rejuvenation techniques in that preliminary acid treatment of the catalyst to remove organics is not required in the present process. The rejuvenation is most conveniently accomplished, for example, in a continuous process designed to retain the catalyst in the hydrogenation converter, by admixing the alkali metal compound with the aromatic amine feed stream prior to or during its introduction into the hydrogenation converter.

The process of this invention can be carried out batchwise, continuously, or semicontinuously as will be apparent to those skilled in the art.

This invention will be better understood by reference to the following illustrative examples wherein parts and percentages are by weight unless otherwise indicated. Unless otherwise indicated, the reaction medium in all cases contains less than 0.1 percent water.

EXAMPLE 1

This example illustrates the treatment of a supported ruthenium catalyst under hydrogenation conditions. At a temperature of 210° C. and a total pressure of 5000 p.s.i., in a suitable pressure vessel, 100 parts of di(p-aminophenyl)methane, 50 parts of dioxane, and 0.8 parts of 50% aqueous potassium hydroxide (equal to 0.27% $H_2O$, based on the reaction medium) are subjected to hydrogenation over 10 parts of a finely divided catalyst consisting of about 5% ruthenium on alumina for a period of 30 minutes. The resulting mixture is freed of catalyst by filtration and distilled to strip off the solvent. Final distillation under vacuum gives the fully saturated mixture of isomers of bis(4-aminocyclohexyl)methane in an amount equal to a yield of 97.9% based on the amount of di(p-aminophenyl)methane introduced into the process. In the absence of aqueous potassium hydroxide the yield is less than 90%.

EXAMPLE 2

At a temperature of 225° C. and a total pressure of 5000 p.s.i. in a suitable pressure vessel, 100 parts of di(p-aminophenyl)methane, 50 parts dioxane, and 2 parts sodium methoxide are subjected to hydrogenation over 10 parts of a finely divided catalyst consisting of about 5% ruthenium on alumina for a period of 20 minutes. The resulting mixture is freed of catalyst by filtration and distilled to give the fully saturated mixture of isomers of bis(4-aminocyclohexyl)methane in an amount equal to a yield of 98.3% based on the amount of the starting di(p-aminophenyl)methane. In the absence of sodium methoxide the yield is less than 90%.

EXAMPLE 3

This example is run in the same manner as Example 2 except that the supported catalyst is about 5% ruthenium on kieselguhr. Similarly excellent results are obtained with this moderated catalyst. The untreated catalyst contains 0.058% sodium whereas the recovered moderated catalyst contains 1.1% sodium.

EXAMPLE 4

This example is run in the same manner as in Example 2 except that the supported catalyst is about 5% ruthenium on barium sulfate. Similarly excellent results are obtained with this moderated catalyst. The untreated catalyst contains 0.005% sodium whereas the recovered moderated catalyst contains 3.7% sodium.

EXAMPLE 5

This example is run in the same manner as in Example 2 except that 2 parts of potassium tert-butoxide are subtituted for the sodium methoxide. Similarly excellent results are obtained.

EXAMPLE 6

At a temperature of 225° C. and a total pressure of 5000 p.s.i. in a suitable pressure vessel, 100 parts of di(p-aminophenyl)methane, 50 parts dioxane, and 2 parts sodium methoxide are subjected to hydrogenation over 10 parts of a finely divided catalyst consisting of about 5% ruthenium on calcium carbonate for a period of 30 minutes. The resulting mixture is freed of the catalyst by filtration and distilled to give the fully saturated mixture of isomers of bis(4-aminocyclohexyl)methane in a yield of 98.9% based on the amount of the starting di(p-aminophenyl)methane.

EXAMPLE 7

At a temperature of 180° C. and a total pressure of 5000 p.s.i. in a suitable pressure vessel, 100 parts of di(p-aminophenyl)methane, and 2 parts sodium methoxide are subjected to hydrogenation over 10 parts of a finely divided catalyst consisting of about 5% ruthenium on alumina. The resulting mixture is freed of catalyst by filtration and distilled to give the fully saturated mixture of isomers of bis(4-aminocyclohexyl)methane in a yield of 96.9% based on the amount of the starting di(p-aminophenyl)methane. In the absence of sodium methoxide the yield is 84.2%. The untreated catalyst contains 0.05% sodium whereas the recovered moderated catalyst contains 2.2% sodium.

EXAMPLE 8

At a temperautre of 225° C. and a total pressure of 5000 p.s.i. in a suitable pressure vessel, 100 parts of di(p-aminophenyl)methane, 50 parts dioxane, and 2 parts sodium methoxide are subjected to hydrogenation over 10 parts of a finely divided catalyst consisting of about 5% ruthenium on mixed rare earth oxides for a period of 20 minutes. The resulting mixture is freed of the catalyst by filtration and distilled to give the fully saturated mixture of isomers of bis(4-aminocyclohexyl)methane in a yield of 99.0% based on the amount of the starting di(p-aminophenyl)methane.

The mixed rare earth oxides used herein are commercially obtained by extraction of the rare earth components in their normally occurring ratio as found in monazite ore.

EXAMPLE 9

At a temperature of 225° C. and a total pressure of 5000 p.s.i. in a suitable pressure vessel, 100 parts of di(p-aminophenyl)methane, 50 parts dioxane, and 4 parts of a 50% aqueous slurry of rubidium hydroxide (equal to 1.3% water based on the reaction medium) are subjected to hydrogenation over 10 parts of a finely divided catalyst consisting of about 5% ruthenium on alumina for a period of 30 minutes. The resulting mixture is freed of the catalyst by filtration and distilled to give the fully saturated mixture of isomers of bis(4-aminocyclohexyl)methane in a yield of 97.3% based on the amount of di(p-aminophenyl)methane introduced into the process. Without the rubidium hydroxide addition, the yield is less than 90%.

EXAMPLE 10

At a temperautre of 225° C. and a total pressure of 5000 p.s.i. in a suitable pressure vessel, 100 parts of di(p-aminophenyl)methane, 50 parts dioxane, and 4 parts of a 50% aqueous slurry of cesium hydroxide (equal to 1.3% water based on the reaction medium) are subjected to hydrogenation over 10 parts of a finely divided catalyst consisting of about 5% ruthenium on alumina for a period of 20 minutes. The resulting mixture is freed of the catalyst by filtration and distilled to give the fully saturated mixture of isomers of bis(4-aminocyclohexyl)methane in a yield of 97.1% based on the amount of di(p-aminophenyl)methane introduced into the process. Without the cesium hydroxide addition the yield is less than 90%.

EXAMPLE 11

At a temperature of 200° C. and a total pressure of 5000 p.s.i. in a suitable pressure vessel, 100 parts of di(p-aminophenyl)methane, and 3 parts of sodium methoxide are subjected to hydrogenation over 10 parts of a finely divided catalyst consisting of about 5% ruthenium on carbon. The resulting mixture is freed of the catalyst by filtration and distilled to give the fully saturated mixture of isomers of bis(4-aminocyclohexyl)methane in a yield of 96.7% based on the amount of di(p-aminophenyl)methane introduced into the process. Without the sodium methoxide addition the yield is 84.5%.

EXAMPLE 12

Test 1

At a temperature of 270° C. and a total pressure of 3000 p.s.i. in a suitable pressure vessel, 100 parts of di(p-aminophenyl)methane and 50 parts of dioxane are subjected to hydrogenation over 10 parts of a finely divided catalyst consisting of about 5% ruthenium on alumina. The resulting mixture is freed of the catalyst by filtration and distilled to give the fully saturated mixture of isomers of bis(4-aminocyclohexyl)methane.

Test 2

A test in all regards identical to that of Test 1 is performed except that 2 parts of sodium methoxide is added. The resulting product is worked up as in Test 1.

The following table summarizes the results of Tests 1 and 2 showing the yield improvement resulting from the in situ treatment of the ruthenium catalyst.

| Test | Bis (4-amino-cyclohexyl) methane | High boiling by-products | Low boiling by-products |
|---|---|---|---|
| 1 | 25.0 | 71.0 | 4.0 |
| 2 | 93.0 | 4.6 | 2.4 |

EXAMPLE 13

A mixture of 1000 parts of di(p-aminophenyl)methane, 100 parts of a finely divided catalyst consisting of about 5% ruthenium on alumina, and 25 parts of sodium methoxide are heated to 125° C. in a feed mix tank for a period of 20 minutes. The resulting mixture is transferred to a suitable hydrogenation vessel and subjected to hydrogenation at a temperature of 225° C. and a total pressure of 4500 p.s.i. The resulting mixture is freed of the catalyst by filtration and distilled to give the fully saturated mixture of isomers of bis(4-aminocyclohexyl)methane in a yield of 98.0% based on the amount of di(p-aminophenyl)methane introduced into the process. Without the sodium methoxide addition, the yield is 86.9%. The untreated catalyst contains .045% sodium, whereas the recovered moderated catalyst contains 2.9% sodium.

EXAMPLE 14

A mixture of 500 parts of di(p-aminophenyl)methane, 500 parts of bis(4-aminocyclohexyl)methane, 20 parts of sodium methoxide, and 100 parts of a finely divided catalyst consisting of about 5% ruthenium on alumina are heated to 140° C. in a feed mix tank for a period of 10 minutes. The resulting mixture is transferred to a suitable pressure vessel and subjected to hydrogenation at a temperature of 225° C. and a total pressure of 4500 p.s.i. The resulting mixture is freed of the catalyst by filtration and distilled to give the fully saturated mixture of isomers of bis(4-aminocyclohexyl)methane. The untreated catalyst contains .045% sodium, whereas the recovered moderated catalyst contains 2.7% sodium.

EXAMPLE 15

Test 1

At a temperature of 225° C. and a total pressure of 5000 p.s.i. in a suitable pressure vessel, 100 parts of di(p-aminophenyl)methane and 50 parts dioxane are subjected to hydrogenation over 10 parts of a finely divided catalyst consisting of about 5% ruthenium on alumina which has become partially deactivated through repeated use in aromatic amine hydrogenations. The resulting mixture is freed of the catalyst by filtration and distilled to recover the fully saturated mixture of isomers of bis(4-aminocyclohexyl)methane.

Test 2

A test in all regards identical to that of Test 1 is performed except that 2 parts sodium methoxide is added. The resulting product is worked up as in Test 1.

The following table summarizes the results of Tests 1 and 2 showing the reactivation of the deactivated catalyst by the in situ treatment method using sodium methoxide.

| Test | Bis (4-amino-cyclohexyl) methane | High boiling by-products | Low boiling by-products |
|---|---|---|---|
| 1 | 79.2 | 18.4 | 2.4 |
| 2 | 97.7 | 1.4 | 0.9 |

EXAMPLE 16

Test 1

At a temperature of 225° C. and a total pressure of 5000 p.s.i. in a suitable pressure vessel, 62 parts of di(p-aminophenyl)methane, 167 parts of dioxane, and 0.5 part of 50% aqueous sodium hydroxide (corresponding to 0.25 part of NaOH) are subjected to hydrogenation over 10 parts of a finely divided catalyst consisting of about 5% ruthenium on alumina until the hydrogen uptake stops. The resulting mixture is freed of the catalyst by filtration and distilled under vacuum to recover the fully saturated mixture of isomers of bis(4-aminocyclohexyl)methane.

Test 2

At a temperature of 225° C. and a total pressure of 5000 p.s.i. in a suitable pressure vessel, 62 parts of di(p-aminophenyl)methane, 167 parts dioxane and 3.4 parts of a 0.3 N aqueous sodium hydroxide solution (corresponding to 0.041 part of NaOH) are subjected to hydrogenation over 1 part of a finely divided catalyst consisting of about 5% ruthenium on alumina until the hydrogen uptake stops. The resulting product is worked up as in Test 1.

Test 3

At a temperature of 225° C. and a total pressure of 5000 p.s.i. in a suitable pressure vessel, 62 parts of di(p-aminophenyl)methane, 167 parts dioxane and 12 parts of a 0.085 N aqueous sodium hydroxide solution (corresponding to 0.041 part of NaOH) are subjected to hydrogenation over 1 part of a finely divided catalyst consisting of about 5% ruthenium on alumina until the hydrogen uptake stops. The resulting product is worked up as in Test 1.

Test 4

At a temperature of 225° C. and a total pressure of 5000 p.s.i. in a suitable pressure vessel, 62 parts of di(p-aminophenyl)methane, 144 parts dioxane and 23 parts of a 0.18 N aqueous sodium hydroxide solution (corresponding to 0.166 part of NaOH) are subjected to hydrogenation over 1 part of a finely divided catalyst consisting of about 5% ruthenium on alumina until the hydrogen uptake stops. The resulting product is worked up as in Test 1.

Test 5

At a temperature of 225° C. and a total pressure of 5000 p.s.i. in a suitable pressure vessel, 62 parts of di(p-aminophenyl)methane and 167 parts of a 0.025 N sodium hydroxide solution (corresponding to 0.167 parts of NaOH) are subjected to hydrogenation over 1 part of a finely divided catalyst consisting of about 5% ruthenium on alumina until the hydrogen uptake stops. The resulting product is worked up as in Test 1.

Test 6

At a temperature of 225° C. and a total pressure of 5000 p.s.i. in a suitable pressure vessel, 62 parts of di(p-aminophenyl)methane and 167 parts of a 0.25 N sodium hydroxide solution (corresponding to 1.67 parts of NaOH) are subjected to hydrogenation over 1 part of a finely divided catalyst consisting of about 5% ruthenium on alumina until the hydrogen uptake stops. The resulting product is worked up as in Test 1.

The following table summarizes the results of Tests 1 to 6 showing the adverse effect of water in excess of 5% on the yield of bis(3-aminocyclohexyl)methane.

| Test | Percent water | Bis (4-aminocyclohexyl) methane | High boiling by-products | Low boiling by-products |
|---|---|---|---|---|
| 1 | 0.11 | 98.5 | .7 | .8 |
| 2 | 1.5 | 98.2 | 1.0 | .8 |
| 3 | 5 | 97.0 | 2.1 | .9 |
| 4 | 10 | 95.3 | 3.7 | 1.0 |
| 5 | 73 | 70.3 | 26.7 | 3.0 |
| 6 | 72 | 70.3 | 28.3 | 1.4 |

I claim:

1. In a process for alkali moderating a supported ruthenium catalyst suitable for the hydrogenation of aromatic amines to the corresponding saturated cyclic amines, the improvement comprising mixing the supported ruthenium catalyst with an alkoxide or hydroxide of an alkali metal selected from lithium, sodium, potassium, rubidium, and cesium in situ in the hydrogenation process at about 30–300° C.;

with the proviso that the maximum amount of water that can be present in the reaction medium is about 5 weight percent of said medium.

2. The improvement of claim 1 wherein the extent of alkali moderation is 0.1–15 percent of the alkali metal, based on the weight of the moderated supported ruthenium catalyst.

3. The improvement of claim 2 wherein the amount of the starting alkali metal alkoxide or hydroxide is about 1 to 35 weight percent of the starting supported ruthenium catalyst, and the maximum amount of water that can be present in the reaction medium is about 2 weight percent of said medium.

4. The improvement of claim 3 wherein the alkali metal alkoxide or hydroxide is selected from sodium and potassium hydroxides, methoxides, ethoxides, propoxides, and butoxides; and the ruthenium catalyst is supported on a carrier selected from alumina, barium sulfate, and kieselguhr.

5. The improvement of claim 4 wherein the sodium or potassium alkoxide is added as a dry solid.

6. The improvement of claim 4 wherein the sodium or potassium hydroxide is added as an aqueous or alcoholic solution or slurry.

7. The improvement of claim 4 wherein the reaction medium comprises a solvent selected from the aromatic amine hydrogenation product, a saturated aliphatic or alicyclic hydrocarbon, a $C_1$–$C_4$ alcohol, and an aliphatic or alicyclic ether.

8. The improvement of claim 4 wherein the aromatic amine is di(p-aminophenyl)methane.

9. The improvement of claim 8 wherein the reaction medium also contains bis(4-aminocyclohexyl)methane.

References Cited

UNITED STATES PATENTS 3,193,584   7/1965   Rylander et al. ____ 252—443 X

CARL F. DEES, Primary Examiner

U.S. Cl. X.R.

252—460, 466 R, 473; 260—563 C